Feb. 13, 1940.    E. BAER    2,190,621
PROCESS FOR WELDING
Filed May 18, 1938
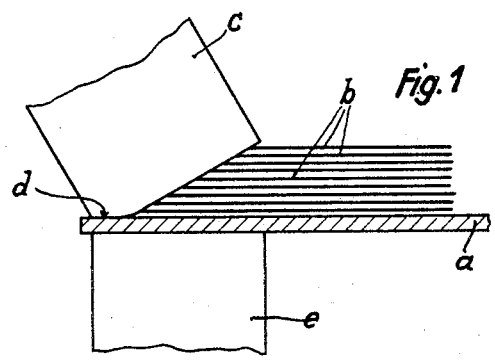
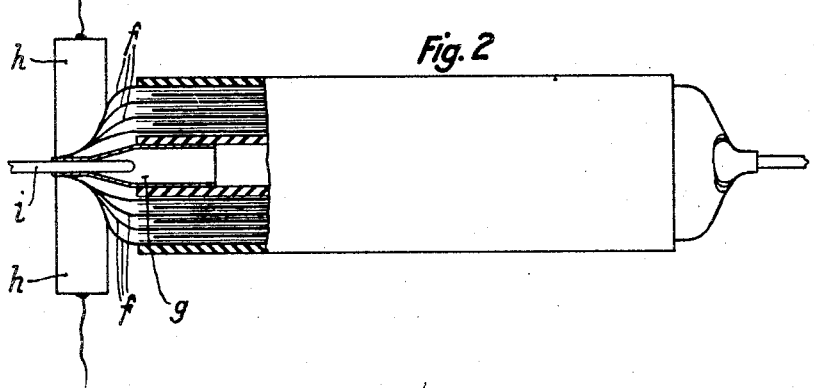
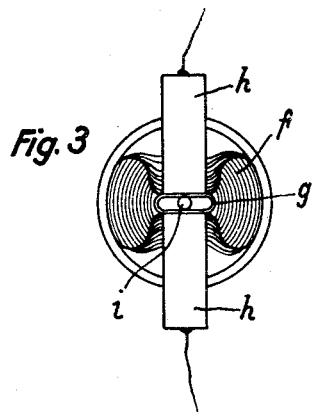
Inventor:
Ernst Baer
by Roy F. Steward
his attorney Patented Feb. 13, 1940

2,190,621

UNITED STATES PATENT OFFICE 2,190,621

PROCESS FOR WELDING

Ernst Baer, Berlin-Charlottenburg, Germany, assignor to Robert Bosch Gesellschaft mit beschränkter Haftung, Stuttgart, Germany Application May 18, 1938, Serial No. 208,693
In Germany May 18, 1937

4 Claims. (Cl. 219—10)

The present invention relates to the welding of one or more thin sheet metal lamellae or foils and a metal carrier.

In the welding of very thin metal parts, e. g., lamellae or foils, and a stronger part serving them as a carrier, by means of spot welding, there exists the danger that the thin parts will burn away on the passage of current, if the entire welding current passes through them. Obviously a good welded connection cannot be obtained in this case.

On the other hand, it has been shown that the thin metal parts do not burn away if, in accordance with the present invention, one of the welding electrodes is so set up on welding that it bears during the welding process both on the thin metal parts, e. g., lamellae or foils, and on the carrier. In this case, there occurs in fact a branching of the welding current through the lamellae and the carrier, which causes a decrease of the current heat on the thin metal parts.

The invention is more particularly described with reference to the accompanying drawing, in which—

Figure 1 shows the welding of a number of thin lamellae with a thicker metal sheet, and Figures 2 and 3 show a cartridge condenser of which the metal coatings, connection electrodes and feed wires, which project at the ends, are welded by the process according to the invention.

In Figure 1, $a$ is a copper sheet 1 mm. thick, with which a number of brass lamellae 0.1 mm. thick, which are placed one above the other, are to be welded. As will be seen from the drawing, the lamellae $b$ are placed stepwise one above the other upon the sheet $a$ in order that the welding electrode $c$ may bear as far as possible on all the lamellae $b$. The copper sheet $a$ is in contact with the welding electrode $c$ at the point $d$. In order that the contact surface may be as large as possible, the welding electrode $c$ is rounded off here, and thus its shape is adapted to the position of the sheet $a$ and the lamellae $b$ relative to each other. The second welding electrode $e$ is placed upon the lower side of the sheet $b$.

In the case of the cartridge condenser shown in Figures 2 and 3, $f$ are the metal coatings projecting at the ends of the winding, and they consist of thin aluminium foils (thickness about 0.006 mm.) and are to be welded to the electrode $g$. The electrode $g$ consists of copper sheeting having a thickness of about 0.05 mm. In this case, according to the invention both the rod-shaped welding electrodes $h$ of the welding machine are so set up during welding, that they bear both on the foils $f$ and on the electrode sheet $g$. The support of the welding electrodes is again improved by the fact that its shape is adapted to the position of the foils and the electrode $g$ relative to each other by means of rounding off the rim supported on the electrode $g$.

At the same time as the foils $f$ and the electrode $g$ are welded, the connecting wire $i$ is welded with the electrode $g$. Thus, according to Figure 3, the cylindrical electrode sheet $g$ is first pressed flat by the welding electrodes $h$. Thus it has been made possible by the process according to the invention to make a completely satisfactory welded connection between the foils $f$, the electrode $g$, and the connecting wire $i$ in one work step.

I declare that what I claim is:

1. A process for welding a plurality of thin sheet metal lamellae or foils, and a metal carrier by spot welding, comprising arranging said lamellae in superposed relation so that an end portion of each lamellae is exposed, setting up an electrode so that prior to and during the welding process it bears both on the said lamellae and on the carrier, and passing a welding current through the electrode, lamellae and carrier.

2. A process for welding a series of thin sheet metal lamellae or foils and a metal carrier by spot welding, comprising arranging said lamellae stepwise one above the other, setting up an electrode so that during the welding process it bears both on the lamellae and on the carrier, and passing an electric current through said lamellae, carrier and electrode.

3. A process for welding a plurality of thin sheet metal lamellae or foils by spot welding, comprising arranging said lamellae stepwise in superposed relation so that an end portion of each lamella is exposed, contacting an electrode with said lamellae so that during the welding operation it bears against the exposed end portions of all of said lamellae, and passing an electric welding current through said lamellae and said electrode.

4. A process for electrically connecting, by welding, a terminal wire connection, a terminal electrode and the terminals of thin sheet metal lamellae or foils of an electrical condenser, comprising arranging said lamellae stepwise one above the other on said terminal electrode, contacting said terminal electrode and said terminal wire connection, setting up a welding electrode so that during the welding operation it bears both on the lamellae and on said terminal electrode, and passing an electric welding current through said welding electrode, lamellae, terminal electrode and terminal wire connection.

ERNST BAER.